W. H. HIMES.
VARIABLE SPEED GEARING.
APPLICATION FILED MAR. 1, 1919.
1,384,758.
Patented July 19, 1921.
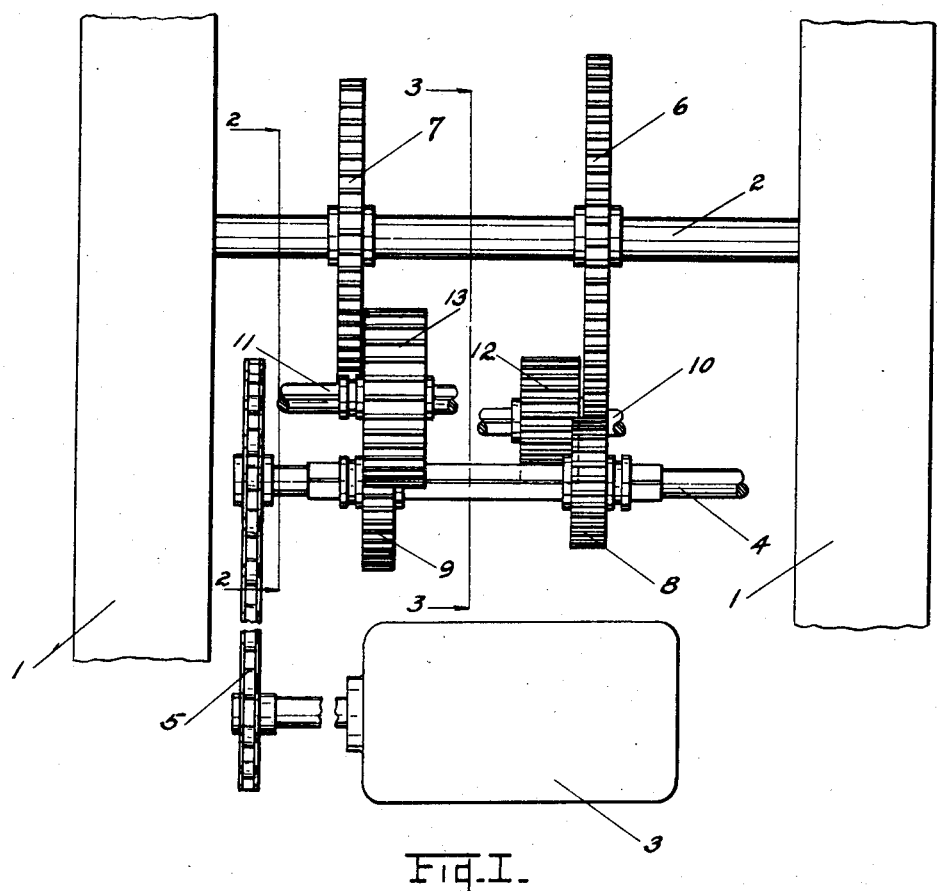
Fig. I.
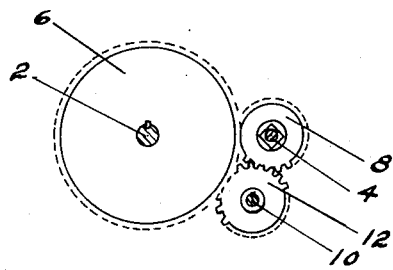
Fig. III.
Witnesses
Fred Ullrich
Lenn Gilman
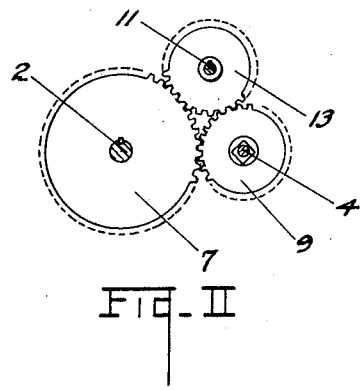
Fig. II.
Inventor
Walter H Himes
By Chappell & Earl
Attorneys

UNITED STATES PATENT OFFICE.

WALTER H. HIMES, OF GROVE CITY, PENNSYLVANIA, ASSIGNOR TO HIMES COHEN TRACTOR CO., OF GROVE CITY, PENNSYLVANIA.

VARIABLE-SPEED GEARING.

1,384,758. Specification of Letters Patent. Patented July 19, 1921.

Application filed March 1, 1919. Serial No. 280,122.

*To all whom it may concern:*

Be it known that I, WALTER H. HIMES, a citizen of the United States, residing at Grove City, Mercer county, Pennsylvania, have invented certain new and useful Improvements in Variable-Speed Gearing, of which the following is a specification.

This invention relates to improvements in variable speed gearing.

My improved variable speed gearing is especially designed by me for use in tractor plows of the alternating type such as I have shown in my co-pending application for Letters Patent, and I have illustrated my improvements as adapted by me for such structures, although the same has features of advantage and may be readily adapted for use in other relations.

The main object of this invention is to provide an improved variable speed gearing whereby two speeds in each direction are secured.

A further object is to provide an improved variable speed gearing which is simple in structure and capable of performing heavy work.

Further objects, and objects relating to details and economies of construction will appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:

Figure I is a detail plan view of a structure embodying the features of my invention, the various parts being shown mainly conventionally.

Fig. II is a vertical section on a line corresponding to line 2—2 of Fig. I.

Fig. III is a vertical section on a line corresponding to line 3—3 of Fig. I.

In the drawing similar reference characters refer to similar parts throughout the several views.

Referring to the numbered parts of the drawing, 1, 1 represents the traction wheels, the axle not being illustrated. 2 represents the jack shaft of the tractor, it being in this embodiment the driven shaft. 3 represents the motor which is connected to the driving shaft 4 by suitable means, as the chain 5 and suitable sprocket wheels. In practice a clutch mechanism is interposed between the driving shaft and the source of power, the clutch mechanism not being here illustrated.

Fixed to the driven shaft 2 are driven gears 6 and 7. Driving gears 8 and 9 are splined to the driving shaft 4 to be shifted into and out of mesh with the gears 6 and 7, respectively, thus securing a variable speed drive in one direction for the driven shaft 2. The means for shifting the gears 8 and 9 are not illustrated, as suitable mechanisms are well known in the art.

Parallel with the shafts 2 and 4 are reverse gear shafts 10 and 11. Splined to the reverse gear shafts are reverse gears 12 and 13. These gears 12 and 13 may be shifted into and out of mesh with the gears 6 and 7, the shifting means not being illustrated. The reverse gears 12 and 13 are of such width as to mesh with the driven gears and driving gears when the driving gears are out of mesh with the driven gears, thus securing a reverse drive for the driven gears.

The driving gears are, in the structure illustrated, of such width as to mesh with the reverse gears while the driving gears are in mesh with the driven gears, thus providing a continuous drive for the reverse gears so that clashing therewith is prevented when the reverse gears are shifted. By this arrangement of parts I secure a very practical two speed forward and two speed reverse gearing, and one especially desirable for heavy work such as on tractor plows of the type shown in my co-pending application above referred to. As the tractor plow to which my gearing is especially designed is of the alternating type, but little turning is required, and I have shown no differential in the jack shaft 2, although my improvements may, as occasion requires, be readily adapted to such a combination.

I have only shown such features of a tractor structure as seemed to be desirable to illustrate a satisfactory adaptation or embodiment of my invention. I have not attempted to illustrate or describe various modifications or adaptations which I contemplate, as I believe the disclosure made will enable those skilled in the art to which my invention relates to adapt or embody the same as may be desired.

Having thus described my invention, what I claim as new and desire to secure by Letters Patent, is:

1. In a gearing, the combination of a driving shaft, a driven shaft, variable speed driven gears on said driven shaft, variable speed driving gears splined to said driving shaft to be shifted into and out of mesh with their coacting driven gears on said driven shaft, and reverse gears mounted to be shifted into and out of mesh with said driven gears, said reverse gears being of such width as to mesh with said driving gears when the driving gears are out of mesh with the driven gears, said driving gears being of such width as to mesh with said reverse gears so that the reverse gears are continuously driven with the driving gears and clashing therewith in shifting prevented.

2. In a gearing, the combination of a driving shaft, a driven shaft, variable speed gears, fixed to said driven shaft, variable speed driving gears so disposed on said driving shaft as to permit longitudinal movement into and out of mesh with their coacting driven gears, and reverse gears mounted to be shifted into and out of mesh with said driven gears, and being of such width as to be able to mesh simultaneously with both driven and driving gears when the latter are out of mesh with the former, driving gears to be of such excess width over that of driven gears that they may retain mesh with the reverse gear when the driving gear is in mesh with the driven gear and the reverse gear is out of mesh with driven gear.

3. In a gearing, the combination of driving shaft, a driven shaft, a driven gear fixed to said driven shaft, a driving gear so disposed on said driving shaft as to permit longitudinal movement into and out of mesh with their coacting driven gear, said driving gear having an excess width over that of the driven gear, a reverse gear so mounted and so disposed as to maintain continuous mesh with the coacting driving gear regardless of whether driving gear or reverse gear is in mesh with driven gear.

In witness whereof, I have hereunto set my hand and seal in the presence of two witnesses.

WALTER H. HIMES. [L. S.]

Witnesses:
 LOUISE SPEARS,
 ALVERDA MILNER.